(12) United States Patent
Beardsley et al.

(10) Patent No.: US 7,936,454 B2
(45) Date of Patent: May 3, 2011

(54) THREE MIRROR ANASTIGMAT SPECTROGRAPH

(76) Inventors: Burt Jay Beardsley, Tucson, AZ (US);
Wendy Lynn Beardsley, Tucson, AZ (US)

( * ) Notice: Subject to any disclaimer, the term of this patent is extended or adjusted under 35 U.S.C. 154(b) by 0 days.

(21) Appl. No.: 12/551,375

(22) Filed: Aug. 31, 2009

(65) Prior Publication Data
US 2009/0316146 A1    Dec. 24, 2009

Related U.S. Application Data

(63) Continuation-in-part of application No. 12/246,232, filed on Oct. 6, 2008.

(60) Provisional application No. 60/977,936, filed on Oct. 5, 2007.

(51) Int. Cl.
*G01J 3/30*      (2006.01)
(52) U.S. Cl. .................................................. 356/318
(58) Field of Classification Search .............. 356/328, 356/318
See application file for complete search history.

(56) References Cited

U.S. PATENT DOCUMENTS

| | | | |
|---|---|---|---|
| 4,240,707 A | 12/1980 | Wetherell et al. | |
| 4,265,510 A | 5/1981 | Cook | |
| 4,737,021 A | 4/1988 | Korsch | |
| 5,260,767 A * | 11/1993 | Cook | 356/326 |
| 5,880,834 A * | 3/1999 | Chrisp | 356/328 |
| 6,628,383 B1 | 9/2003 | Hilliard | |
| 2008/0198365 A1 * | 8/2008 | Treado et al. | 356/318 |
| 2009/0316146 A1 * | 12/2009 | Beardsley et al. | 356/303 |

FOREIGN PATENT DOCUMENTS
WO    WO2006/075316    *   7/2006

OTHER PUBLICATIONS

Sarlot et al. "Optical Design of ARIES: the new near infrared science instrument for the adaptive f/15 Multiple Mirror Telescope", Oct. 5, 1999, Proceedings of SPIE, vol. 3779, pp. 274-283.*
Ge et al. "The Optical Design of Rapid Infrared-Visible Multi-Object Spectrometer: a NGST Demonstration Instrument", Mar. 2003, Proceedings of SPIE, vol. 4850, pp. 535-543.*
Woodruff et al. "Technical Implementation of the DESTINY mission concept", Oct. 20, 2004, Proceedings of SPIE, vol. 5487, pp. 2656-2663.*
Gennari et al. "The spectrometer optics of GIANO-TNG", Jun. 29, 2006, Proceedings of SPIE, vol. 6269, pp. 3Z-1-3Z-10.*
D.T. Jaffe et al., "GMTNIRS—The High Resolution Near-IR Spectrograph for the Giant Magellan Telescope", SPIE 2006, vol. 6269.
"13.2 GMTNIRS—The High Resolution Near-IR Spectrograph for the Giant Magellan Telescope", Published by University of Texas, May 2006.

* cited by examiner

*Primary Examiner* — Kara E Geisel
(74) *Attorney, Agent, or Firm* — Dale F. Regelman; Quarles & Brady LLP

(57) ABSTRACT

A portable spectrograph including a primary mirror, a secondary mirror, and a tertiary mirror forming a TMA having a common vertex axis, a diffraction grating, and a dispersive prism, where the portable spectrograph can detect wavelengths between 150 nm and 1.1 µm. The portable spectrograph also may include a collimating mirror and an entrance aperture, which form an interchangeable module. Radiation received through the entrance aperture is reflected in a collimated pattern towards an aperture stop. The diffraction grating, located between the collimating mirror and prism, diffracts radiation passed through the aperture stop into multiple beams directed onto the prism. A flat mirror, located to one side of the vertex axis receives and reflects the multiple beams exiting the prism onto the primary mirror, where they are reflected onto the secondary mirror. The secondary mirror reflects the beams to the tertiary mirror where they are reflected onto an image plane located on the other side of the vertex axis.

18 Claims, 10 Drawing Sheets

THREE MIRROR ANASTIGMAT SPECTROGRAPH

CROSS REFERENCE TO RELATED APPLICATIONS

This application is a Continuation In Part claiming priority from a U.S. Application having Ser. No. 12/246,232, which claimed priority from a U.S. Provisional Application having Ser. No. 60/977,936, filed Oct. 5, 2007.

BACKGROUND

Various implementations, and combinations thereof, are related to optical instruments for use in the measurement of properties of light, and specifically to echelle spectrographs.

An echelle spectrograph is a spectrograph which uses an echelle grating to diffract light at high resolutions and high diffraction orders. As with other blazed diffraction gratings, the echelle grating consists of a number of grooves, the width of the grooves being close to the wavelength of the diffracted radiation. However, echelle gratings are specifically characterized by the large spacing between the grooves and, therefore, the lower groove density.

Light incident upon any blazed grating is split into several different diffraction orders. Each order will be comprised of a different but overlapping wavelength range. The dispersion associated with each order will also be different. The overlapping orders make it difficult to associate the correct order numbers with their wavelength ranges. This ambiguity complicates the spectrum and makes it more difficult to determine the correct wavelength emission from the source.

Although this overlap is generally an unwanted side effect, echelle gratings specifically use this effect to enhance the performance of the spectrograph. A second cross-dispersing element is used to spatially separate the orders. The individual orders, each with a separate (and sometimes overlapping) wavelength range and resolution, can then be analyzed without ambiguity.

Typical echelle spectrographs have a relatively high effective fvalue, generally f/7 or greater, limiting the total light which reaches the image plane and thereby decreasing the resulting image quality. Further, the high effective fvalue of typical echelle spectrographs prevent their use in certain applications such as Raman spectroscopy where the detection of weak emissions requires the use of a spectrograph with a very low fvalue. Clearly, it is desirable to design an echelle spectrograph with a low fvalue.

SUMMARY

In one implementation, a portable spectrograph is presented. The spectrograph includes a primary mirror, a secondary mirror, a tertiary mirror, a diffraction grating, and a dispersive prism. The primary mirror, secondary mirror, and tertiary mirror form a three mirror anastigmat ("TMA") with a common vertex axis. The portable spectrograph can further detect wavelengths between 150 nm and 1.1 µm.

In another implementation, a method of laser induced breakdown spectroscopy (LIBS) using a portable spectrograph and a sensor is presented. The portable spectrograph includes a collimating mirror, a diffraction grating, a dispersive prism, a primary mirror, a secondary mirror, and a tertiary mirror. The primary mirror, the secondary mirror and the tertiary mirror form a three mirror anastigmat ("TMA") having a common vertex axis and the portable spectrograph can detect wavelengths between 150 nm and 1.1 µm. The method includes setting the sensor to a non integrating idle mode and energizing a lasing device to produce a plasma at the radiation source. A laser pulse is then emitted. Lastly, the sensor is set to a different mode a few microseconds after the laser pulse is emitted.

In yet another implementation, a computer program product is presented. The computer program product is encoded in a computer readable medium and is usable with a programmable computer process to perform laser induced breakdown spectroscopy (LIBS) using a portable spectrograph and a sensor. The portable spectrograph includes a collimating mirror, a diffraction grating, a dispersive prism, a primary mirror, a secondary mirror, and a tertiary mirror. The primary mirror, the secondary mirror and the tertiary mirror form a three mirror anastigmat ("TMA") having a common vertex axis and the portable spectrograph can detect wavelengths between 150 nm and 1.1 µm. The computer program product includes computer readable program code which causes the programmable processor to set the sensor to a non integrating idle mode, to energize a lasing device to emit a laser pulse which produces a plasma at the emission source, and to set the sensor to a second mode a few microseconds after the laser pulse is emitted.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
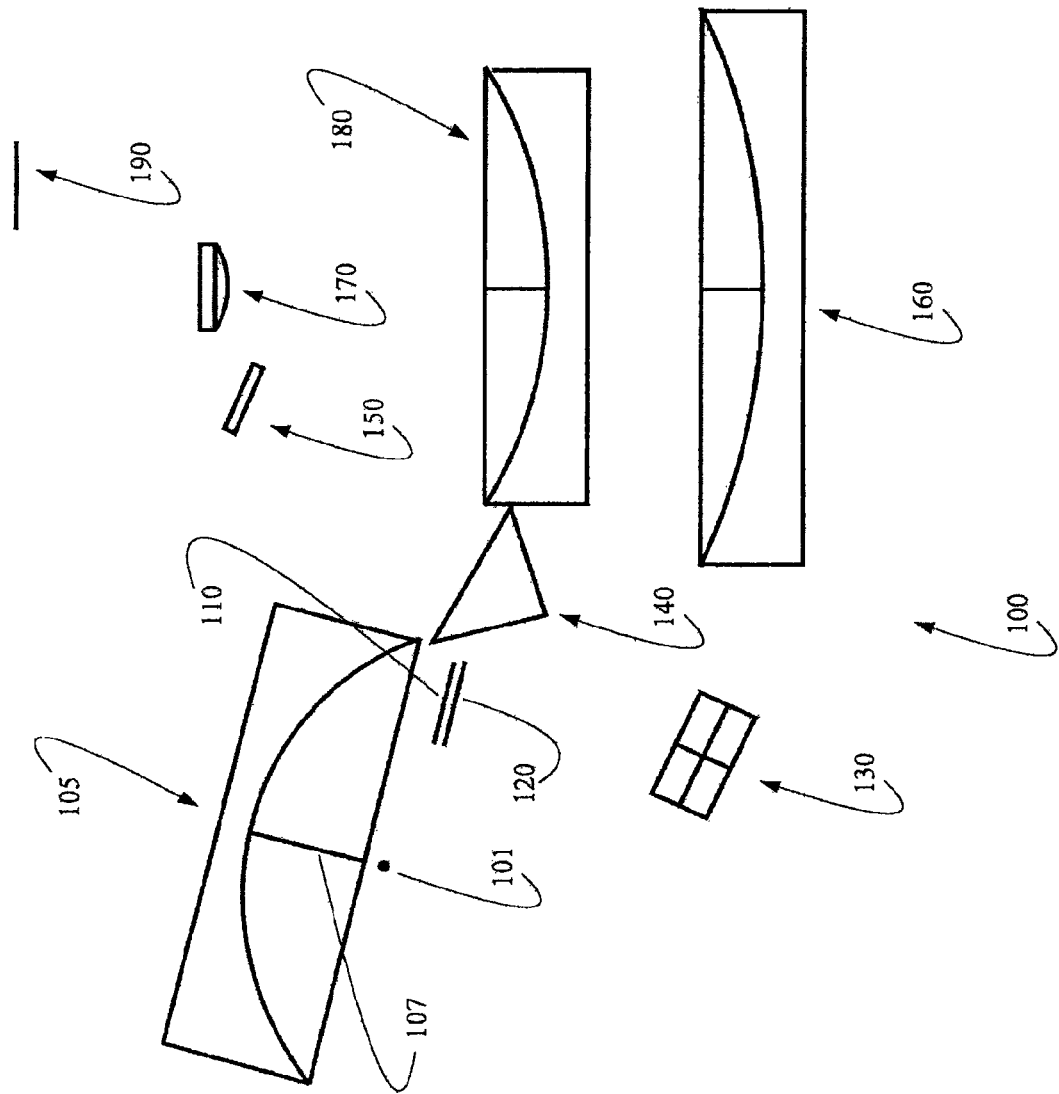
FIGS. 1A and 1B are exemplary block diagrams depicting an embodiment of an echelle spectrograph according to the present discussion.

Referring now to FIG. 1A, Applicant's echelle spectrograph 100 comprises entrance aperture 101, collimating mirror 105 with its parent optical axis 107, aperture stop 110, filter holder 120, diffraction grating 130, prism 140, flat mirror 150, primary mirror 160, secondary mirror 170, tertiary mirror 180, and image plane 190.

Figure 1B:
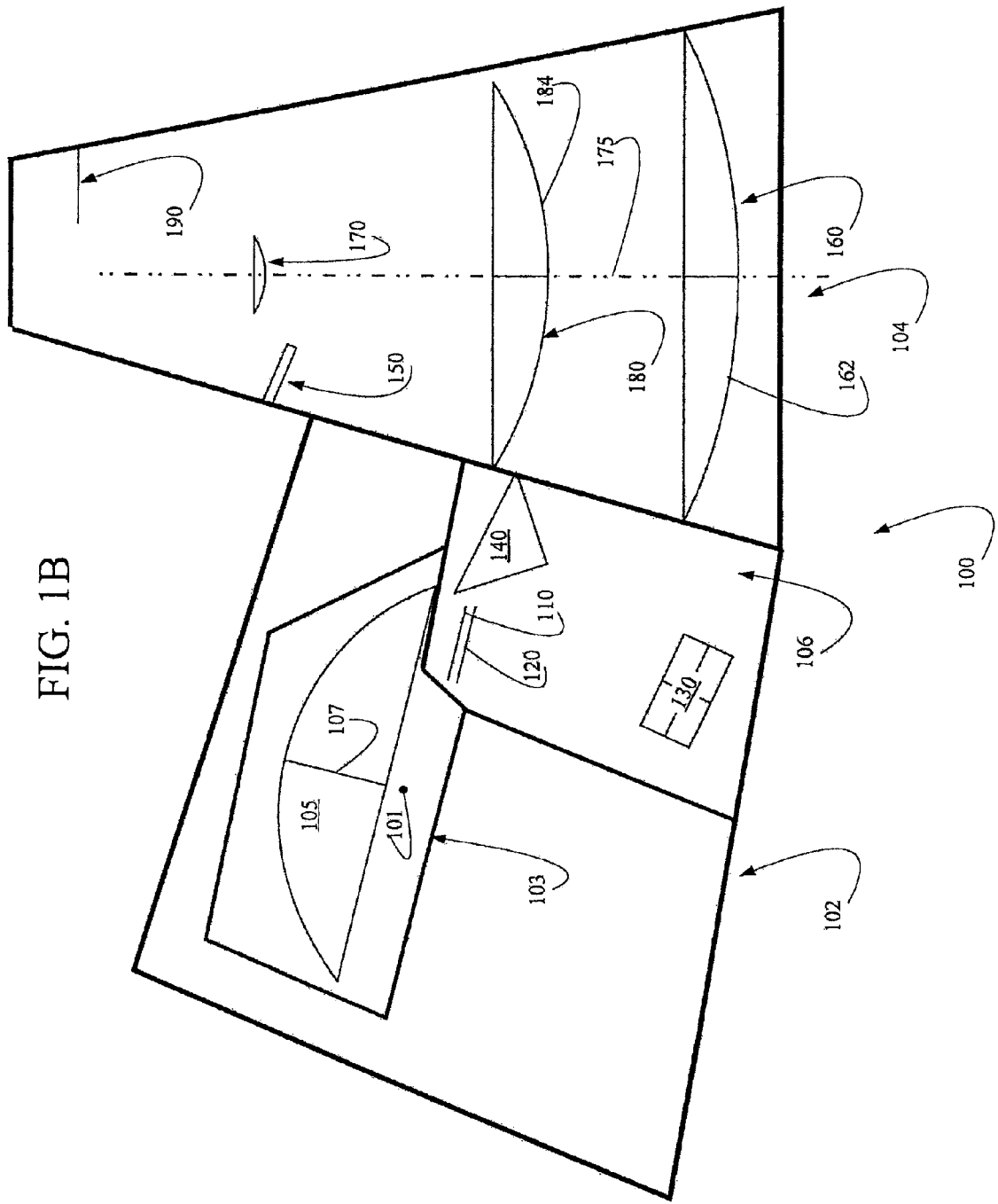

Referring now to FIG. 1B, in certain embodiments Applicant's echelle spectrograph 100 comprises a first module 102 and a second module 104, wherein the first module 102 comprises an interchangeable assembly. In the illustrated embodiment of FIG. 1B, first module 102 comprises entrance aperture 101 located on the parent optical axis 107 of collimating mirror 105, aperture stop 110 located in the collimated light beam leaving collimating mirror 105, filter holder 120, diffraction grating 130, and prism 140.

Interchangeable sub-module 103 is disposed within module 102. Sub-module 103 comprises collimating mirror 105 and entrance aperture 101, which is located along the parent optical axis 107 of collimating mirror 105. In the illustrated embodiment of FIG. 2, collimating mirror 105 comprises a Conic Constant of −1 and Radius of Curvature of 72 mm (concave).

Interchangeable sub-module 106 is also disposed within module 102. Sub-module 106 comprises aperture stop 110, filter holder 120, grating 130, and prism 140. Aperture stop 110 is interchangeable within sub-module 106. In the illustrated embodiment of FIG. 2, light passes through prism 140 once, resulting in lower transmission and reflection losses than in a double pass system with the prism located near or on top of the diffraction grating. The single pass configuration further results in less scattered light.

In the illustrated embodiment of FIG. 1B, second module 104 comprises flat mirror 150, primary mirror 160, secondary mirror 170, tertiary mirror 180 and image plane 190. An imaginary line passing through the vertex, normal to the surface of primary mirror 160, passes through or very close to the vertex of the tertiary mirror 180 and then to (or near) the vertex of secondary mirror 170, defining optical axis 175. This three mirror assembly is referred to as a Three Mirror Anastigmat (TMA). Thus, second module 104 comprises flat mirror 150, the TMA, and image plane 190.

Table 1 recites values for the Radius of Curvature, Thickness, and Conic Constant for primary mirror 160, secondary mirror 170 and tertiary mirror 180. The primary and tertiary mirrors have a concave surface, while the secondary mirror surface is convex. For the purposes of the present discussion, an ellipsoidal mirror has a conic constant between 0 and −1. A conic constant of −1 represents a parabolic mirror, a conic constant of 0 represents a spheroidal mirror, and a conic constant of >0 represents an oblate spheroid mirror. Further, for the present discussion, the sign conventions for the radius of curvatures, thicknesses and conic constants are defined as in the attached Zemax ray trace file. A person of ordinary skill in the art will understand that this sign convention is for clarity and illustrative purposes only.

TABLE 1

|  | Radius of Curvature (mm) | Thickness (mm) | Conic Constant |
|---|---|---|---|
| Primary Mirror 160 | 207.08 (concave) | 162.36 | −0.741 |
| Secondary Mirror 170 | 90.52 (convex) | −93.79 | 0 |
| Tertiary Mirror 180 | 135.02 (concave) | 154.62 | 0.035 |

In FIGS. 1A and 1B, the parent mirrors for 105, 160, and 180 are shown in their entirety. The off-axis portions of these mirrors used in echelle spectrograph 100 are shown in FIG. 2 through FIG. 6B.

Figure 2:
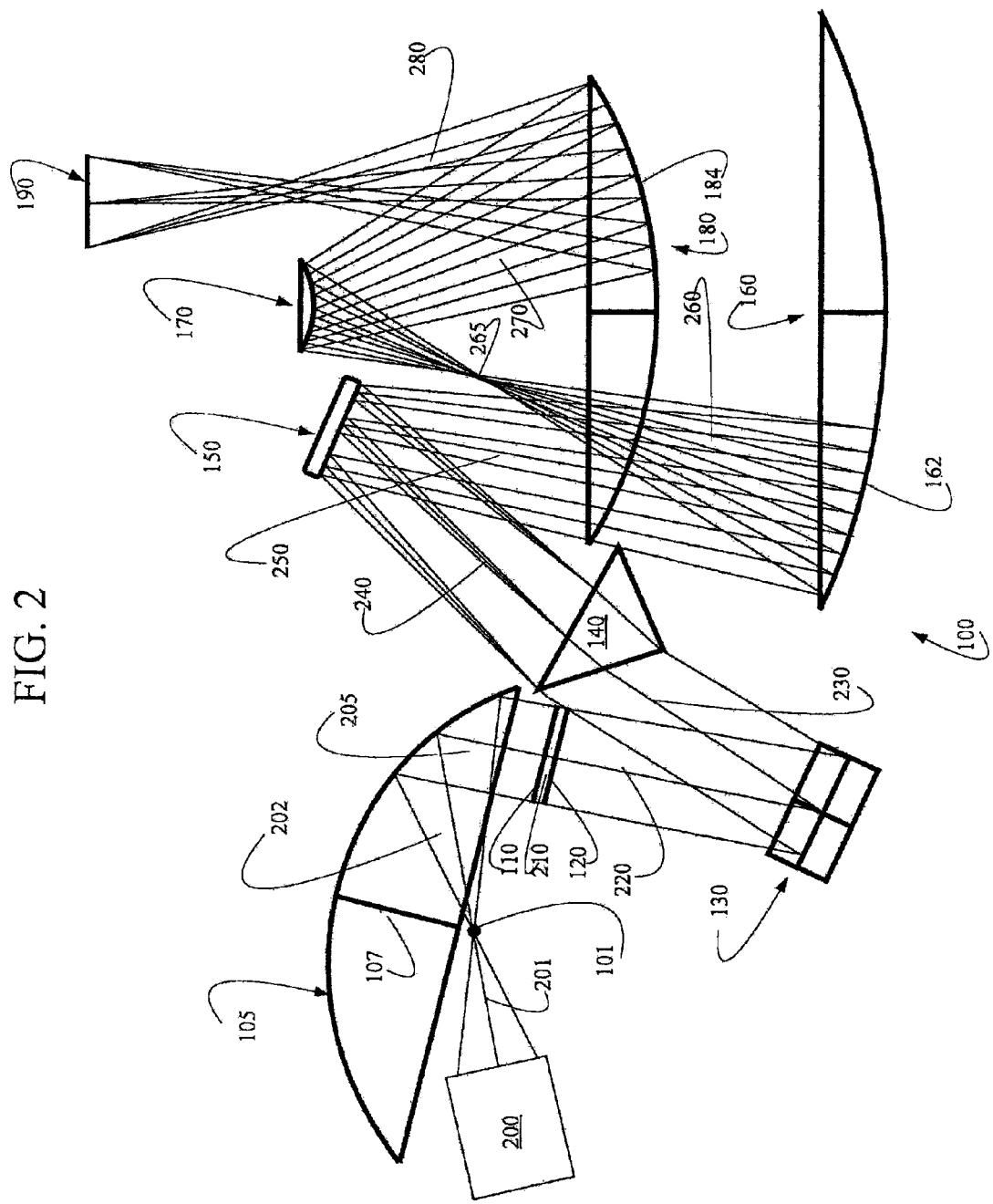
FIG. 2 is an exemplary block diagram illustrating the movement of radiation through the echelle spectrograph of FIGS. 1A and 1B.

Referring now to the illustrated embodiment of FIG. 2, light 201 is emitted by a source 200 external to entrance aperture 101. A cone of light 201 enters through entrance aperture 101 and travels toward collimating mirror 105 as a cone of light 202. The chief ray is defined as the ray that originates at the source and passes through the center of the entrance aperture and then passes through the center of the aperture stop. The chief ray at the center of the cone of light at the entrance aperture is tilted at an angle of approximately 83 degrees with respect to the parent optical axis 107. Light 202 is reflected off collimating mirror 105 to give collimated light 205.

Collimated light 205 passes through aperture stop 110. As those skilled in the art will appreciate, an aperture stop limits the brightness of an image by restricting the size of the angular cone of light passing through the entrance aperture. Therefore, aperture stop 110 is one of the primary parameters controlling the amount of light entering echelle spectrograph 100. In certain embodiments, aperture stop 110 comprises an interchangeable device, such that aperture stop 110 can be adjusted to allow a desired amount of light into echelle spectrograph 100. A smaller aperture stop will result in a sharper image at image plane 190 by reducing optical aberrations. Echelle spectrograph 100 can be optimized for maximum light throughput (large aperture stop 110) or maximum spectral resolution (small aperture stop 110).

In certain embodiments as described for sub-module 103, collimating mirror 105 is interchangeable. This being the case, the focal length of collimating mirror 105 is adjustable. If entrance aperture 101 is located correctly, there are practically no aberrations in light 205, and therefore, light 205 comprises nearly perfect collimated light.

By changing the focal length of collimating mirror 105 within sub-module 103, the "f" value of the input optics for echelle spectrograph 100 can be adjusted. For purposes of this discussion, fvalue=1/(2×(sin θ)) where θ is the half angle of light passing through entrance aperture 101. The numerical aperture (NA) for entrance aperture 101 is defined as NA= sin(θ), or equivalently, $$NA = \sin[\arctan\{D/(2 \times Fc)\}] \quad (1)$$

and, $$f\text{value} = 1/(2 \times NA) \quad (2)$$

where D is the diameter (if circular) of aperture stop 110 and Fc is the effective off-axis focal length of collimating mirror 105. The NA and fvalue can be generalized by an "averaged NA" or averaged fvalue if D is non-circular.

A greater fvalue (smaller NA) will cause less total light to reach image plane 190. Prior art echelle spectrographs comprise approximately f/7 or greater systems. In contrast, Applicant's echelle spectrograph 100 effectively comprises an f/3 or faster optical system (NA>0.15). This represents approximately a 10× improvement in light throughput compared to prior art devices.

The total amount of light collected from source 200 through entrance aperture 101 is defined by the etendue (E) of the system at aperture stop 110. At aperture stop 110, E is proportional to the product of entrance aperture 101's area and the solid angle of the light passing through entrance aperture 101. Therefore, increasing either the solid angle (proportional to either $1/\{fvalue^{}2\}$ or $NA^{}2$) of light passing through entrance aperture 101 or increasing the area of entrance aperture 101 will increase total throughput (E) of the instrument. However, as those skilled in the art will appreciate, in general, the spectral resolution (defined by the full width at half maximum of a spectral emission line, FWHM) of an instrument is approximately proportional to the width of entrance aperture 101.

As those skilled in the art will further appreciate, the light passing through echelle spectrograph 100 contains multiple spectral orders that are separated, or dispersed, as light passes through prism 140. Furthermore, the height of entrance aperture 101 must be less than the distance between the spectral orders at image plane 190, or cross-talk between the spectral orders will occur. Therefore, the size of the entrance aperture 101 is limited in both height and width to provide good spectral order separation and high spectral resolution at image plane 190. The best way to increase throughput is to decrease the effective fvalue (increase NA) of module 102.

It is important to note that source 200 must be optically coupled to entrance aperture 101. Furthermore, to maximize throughput of light, the fvalue of the optics associated with source 200 must perfectly match the fvalue of the input optics defined by Fc and D in module 102 (see equations 1 and 2). Each embodiment of source 200 can have a very different fvalue. For example, the typical effective fvalue of an optical fiber is f/2.3 (NA=0.22) and the fvalue of a telescope can be f/16 or higher.

In certain embodiments, Applicant's echelle spectrograph 100 can have collimating mirror 105 of a different focal length without changing the mirror diameter. For example, if the focal length of collimating mirror 105 is doubled, then the fvalue of the collecting optics as defined by Equation 2 is increased by a factor of about 2 (NA is half) if D remains unchanged. The magnification of echelle spectrograph 100 is defined by the effective ratio of module 104 (Fi) to module 102 (Fc):

$$M = Fi/Fc \qquad (3)$$

When Fc is doubled, M is halved. The image of entrance aperture 101 projected onto image plane 190 at a given wavelength (or equivalently, the FWHM of a spectral emission line) will then be approximately half the size as with the original module 102. It is therefore possible to double entrance aperture 101 (in both height and width) to preserve the total throughput or etendue of echelle spectrograph 100 without degrading spectral resolution or changing any of the optics outside of sub-module 103. Applicant's echelle spectrograph 100 can match any source 200 from approximately f/2 to >f/16 while maximizing etendue by simply changing Fc and the diameter of the entrance aperture 101 in sub-module 103. At the same time, the spectral resolution and order overlap will remain unchanged. The image quality and order location at image plane 190 will also remain unchanged as long as entrance aperture 101 is at the correct location (with the appropriate size) and D remains unaltered.

Figure 3:
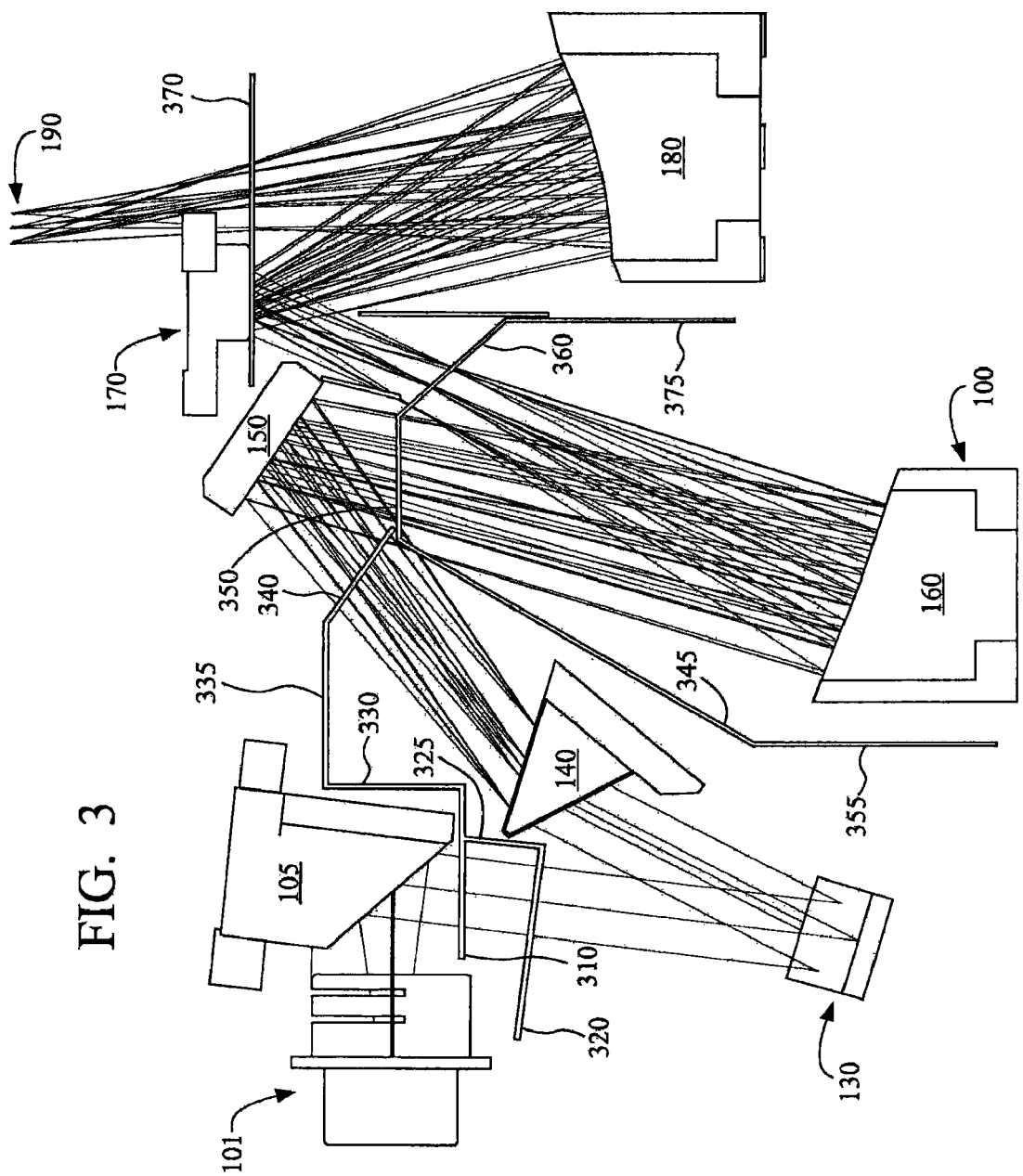
FIG. 3 is an exemplary diagram depicting an embodiment of an echelle spectrograph having multiple baffles.
Figure 4:
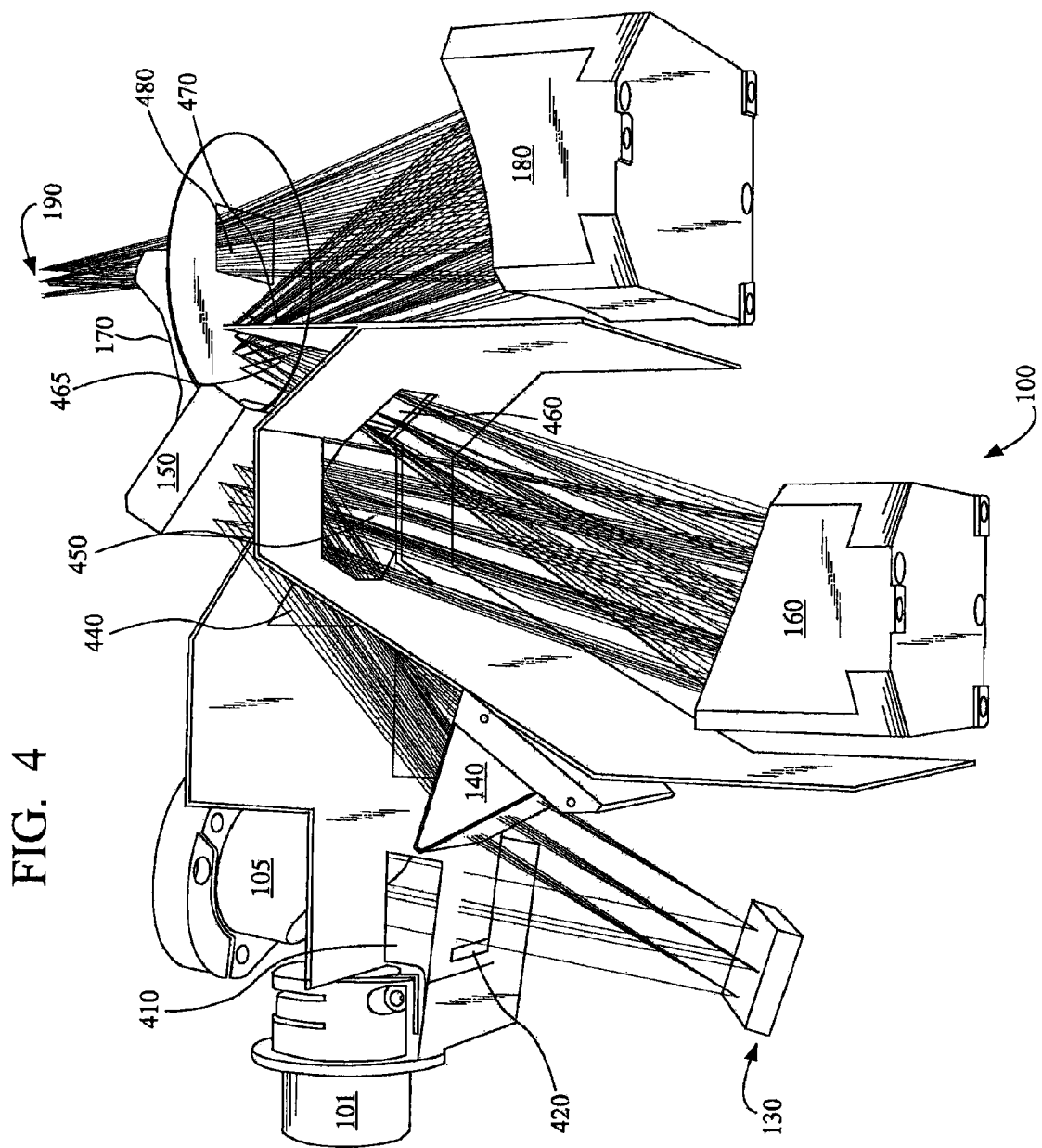
FIG. 4 is an exemplary computer rendered image depicting the echelle spectrograph of FIG. 3.

Referring now to FIGS. 3 and 4, Applicant's echelle spectrograph 100 further comprises baffles 310, 320, 325, 330, 335, 340, 345, 350, 355, 360, 370 and 375. In certain embodiments, baffles 345 and 355 define the boundaries of modules 102 and 104.

Baffle 310 is formed to define window 410. Baffle 310 is positioned such that light 210 passes through window 410. Baffle 320 is formed to include an aperture 420. Filter holder 120 is positioned within aperture 420 and in certain embodiments the filter in filter holder 120 is interchangeable.

Light 210 passes through filter holder 120 and produces light 220. Light 220 is directed onto diffraction grating 130. Light 220 comprises a polychromatic beam, i.e., light 220 comprises electromagnetic radiation containing a plurality of wavelengths. The nature of source 200 determines the constituent wavelengths of light 220.

As those skilled in the art will appreciate, diffraction grating 130 separates incident light 220 into a plurality of constituent wavelengths, i.e., light 220 is dispersed by diffraction grating 130. When light 220 is incident on diffraction grating 130 with an angle $\theta_i$ (measured from the normal of the grating), that light is diffracted into several beams. The beam that corresponds to direct transmission (or specular reflection in the case of a reflection grating) is called the zero order, and is denoted m=0. The other orders correspond to diffraction angles which are represented by non-zero integer values for m. For a groove period d and an incident wavelength λ, the grating equation (1) gives the value of the diffracted angle $\theta_m(\lambda)$ in the order m:

$$d(\sin \theta_m(\lambda) + \sin \theta_i) = M\lambda \qquad (4)$$

The diffracted beams corresponding to consecutive orders may overlap, depending on the spectral content of the incident beam and the grating density. The higher the spectral order, the greater the overlap of light into the next order.

Light 230 that is reflected from diffraction grating 130 comprises a plurality of beams dispersed by wavelength. Light 230 is directed onto dispersive prism 140. As those skilled in the art will appreciate, light changes speed as it moves from one medium to another, for example, from air into the matrix of prism 140. Under Huyghens principle, such a speed-change causes light striking the boundary between two media at an angle to be refracted and enter the new medium at a different angle.

In accordance with Snell's law, the degree of bending of a light path is a function of inter alia, the ratio between the refractive indices of the two media. The refractive index of a medium varies with the wavelength of the light. This being the case, light 230 traveling through prism 140 is further dispersed by wavelength, but in a direction orthogonal to the dispersion direction of the grating. In FIG. 1A through FIG. 6, the propagation direction is the local Z axis. The X direction is in the plane of the page and orthogonal to the local Z axis. The Y direction is orthogonal to both the X and Z direction. The grating dispersion direction is in the Y direction and the prism dispersion is in the X direction.

As described previously, module 102, which includes sub-module 103, comprises the light collecting (collimating mirror 105) and light dispersing optics (diffraction grating 130 and prism 140) of echelle spectrograph 100. Within module 102, diffraction grating 130 can be replaced with another grating of different groove density or blaze angle. Changing the blaze angle or groove density of grating 130 will provide different spectral characteristics at image plane 190 that will affect spectral resolution and order spacing. Diffraction grating 130 is interchangeable in sub-module 106 with a wide range of groove densities and blaze angles that can be used in different embodiments.

Module 102 and sub-module 106 includes prism 140, which controls the total range of wavelengths passing through to image plane 190. By changing prism 140, different wavelength ranges can be utilized at image plane 190. For example, the standard embodiment of echelle spectrograph 100 includes a fused silica (FS) prism 140. The wavelength range using the FS prism 140 is about 190 nm up to about 1.1 microns. If module 102, or in some embodiments sub-module 106, is replaced with a different module containing a CaF2 prism, the wavelength range can be extended down to about 150 nm. Another embodiment can include a BK7 glass prism 140 in module 102. BK7 has higher dispersion than FS or CaF2 but it does not transmit light below 350 nm. The wavelength range of this module would be from about 350 nm up to about 1.1 microns, but the spectral order separation is larger because dispersion is higher with BK7 glass. A taller entrance aperture 101 can then be used to increase the etendue of the instrument for this embodiment with a BK7 glass prism 140. In yet other embodiments, with the appropriate choice of cameras and prisms, wavelengths between 150 nm to 1.1 μm are detectable.

Referring again to FIGS. 3, and 4, baffle 340 is formed to include aperture 440. Baffle 340 is positioned in echelle spectrograph 100 such that light 240 exits prism 140, passes through aperture 440 in baffle 340, and is directed onto flat mirror 150. Light 240 is reflected from flat mirror 150 as light 250. For any given wavelength, the beam is still collimated. However, each wavelength reflects off flat mirror 150 at a slightly different angle because of the dispersion by grating 130 and prism 140.

Baffle 350 is formed to include aperture 450. Baffle 350 is positioned within echelle spectrograph 100 such that light 250 passes through aperture 450 in baffle 350. Light 250 is incident on portion 162 (FIG. 1B) of parent primary mirror 160, wherein portion 162 lies completely on the first side of optical axis 175 (FIG. 1B).

In certain embodiments, primary mirror 160 comprises a radius of curvature of about 207.084 mm (concave) and a conic constant of −0.741. In these embodiments, primary mirror 160 comprises an elliptical mirror.

Light 250 is reflected convergingly and then divergingly from primary mirror 160 as light 260. Light 260 converges from primary mirror 160 to intermediate focus 265 and then diverges from intermediate focus 265 until it strikes secondary mirror 170.

Baffle 360 (FIG. 3) is formed to include aperture 460 (FIG. 4). Baffle 360 is positioned within echelle spectrograph 100 such that light 260 at the intermediate focus 265 passes through aperture 460 of baffle 360. Aperture 460, located at the intermediate focus and being slightly larger than the sensor at the image plane in the camera, eliminates most scattered light from all the optics before this aperture. This greatly increases the dynamic range of the spectrograph and decreases the background noise of the image. Thus, baffle 360 is the most important baffle in the system to prevent stray light from reaching image plane 190. Baffle 370 is formed to include aperture 465, aperture 470, and aperture 480.

In certain embodiments, secondary mirror 170 comprises a radius of curvature of about 90.525 mm (convex) and a conic constant of 0. In these embodiments, secondary mirror 170 comprises a spherical convex mirror.

Light 260 is reflected divergingly from secondary mirror 170 as light 270, wherein light 270 passes through aperture 470 in baffle 370, and onto a second portion 184 (FIG. 1B) of tertiary mirror 180. Portion 184 lies completely on the second side of optical axis 175, wherein the second side of optical axis 175 is opposite the afore-described first side of optical axis 175.

In certain embodiments, tertiary mirror 180 comprises a radius of curvature of about 135.024 mm (concave) and a conic constant of about 0.035. In these embodiments, tertiary mirror 180 comprises an oblate spheroid mirror.

Light 270 is reflected convergingly from portion 184 of tertiary mirror 180 as light 280. Light 280 passes through aperture 480 formed by baffle 370.

Figure 5:
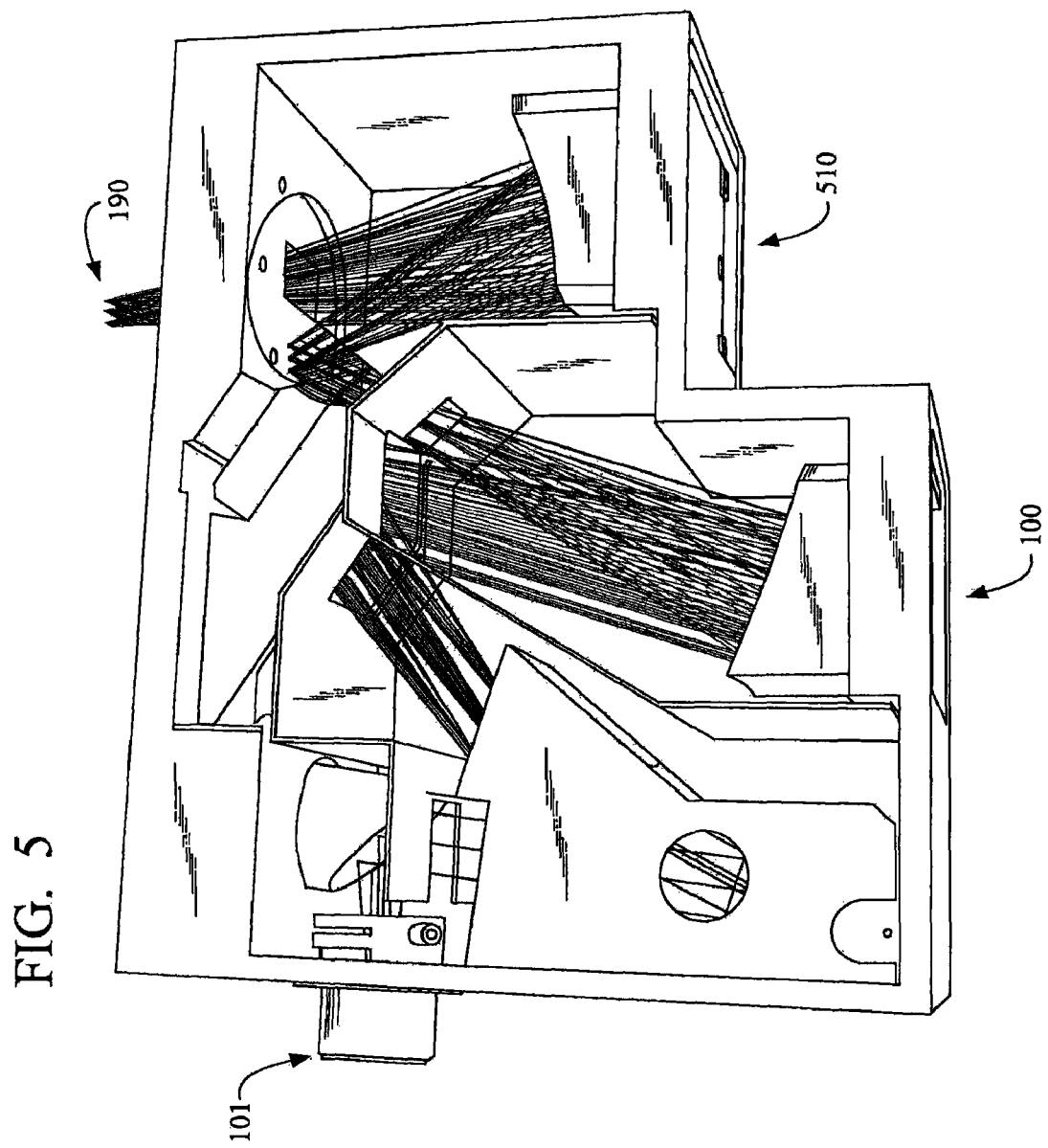
FIG. 5 is an exemplary computer rendered image depicting the echelle spectrograph of FIG. 4 disposed in a housing.

In certain embodiments, certain elements of Applicant's echelle spectrograph 100 are disposed in a housing, wherein source 200 and image plane 190 are external to that housing. For example, in the illustrated embodiment of FIG. 5, Applicant's echelle spectrograph 100 comprises housing 510. Further in the illustrated embodiment of FIG. 5, image plane 190 is external to housing 510. FIG. 5 also illustrates the location of entrance aperture 101, through which light 201 passes from external source 200 (FIG. 2) into echelle spectrograph 100.

In certain embodiments, Applicant's echelle spectrograph 100 is portable. In such embodiments, echelle spectrograph 100 may be hand-held. In other such embodiments, echelle spectrograph 100 may fit into a back pack or other type of personal carrier. In certain embodiments, portable echelle spectrograph 100 fits into a rectangular box having the approximate dimensions: 265×210×110 mm. In certain embodiments, portable echelle spectrograph 100 has a volume of approximately 0.006125 m$^3$ (6,125,000 mm$^3$). In certain embodiments, portable echelle spectrograph 100 weighs approximately 11 lbs. In certain embodiments, Applicant's portable echelle spectrograph 100 comprises carbon fiber and weighs less than 5 lbs. In such an embodiment, portable echelle spectrograph 100 may be used as part of a man-portable backpack system and may be used to detect chemical, biological, and nuclear hazards. In certain embodiments, Applicant's portable echelle spectrograph 100 may be used to perform Raman spectroscopy.

Figure 6A:
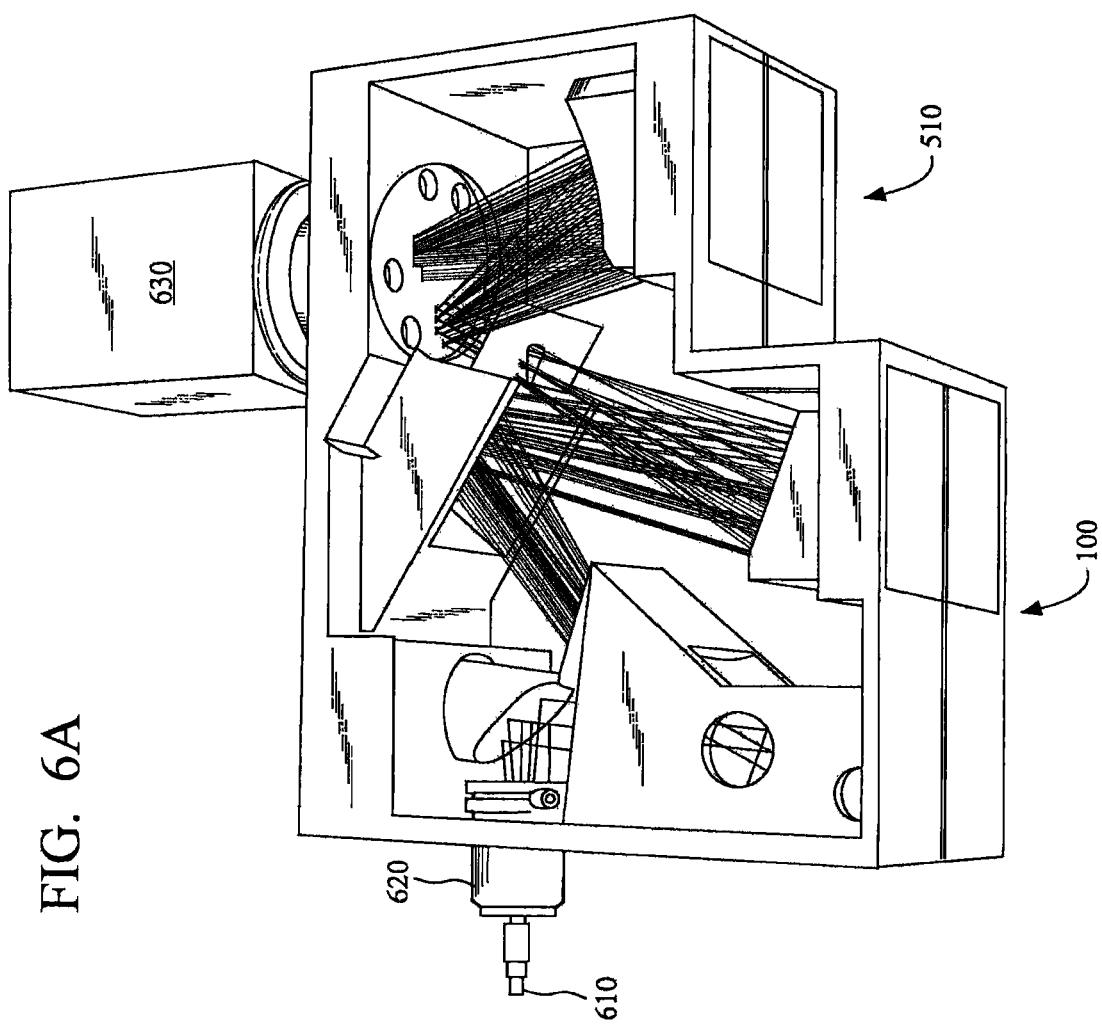
FIGS. 6A and 6B are exemplary computer rendered images depicting the echelle spectrograph of FIG. 5 including a fiber optic cable input and a camera.

In the illustrated embodiment of FIG. 6A, Applicant's echelle spectrograph 100 comprises fiber optic cable input 610, electro-mechanical shutter 620 and sensor 630. Sensor 630 is positioned such that image plane 190 is disposed within sensor 630.

Figure 6B:
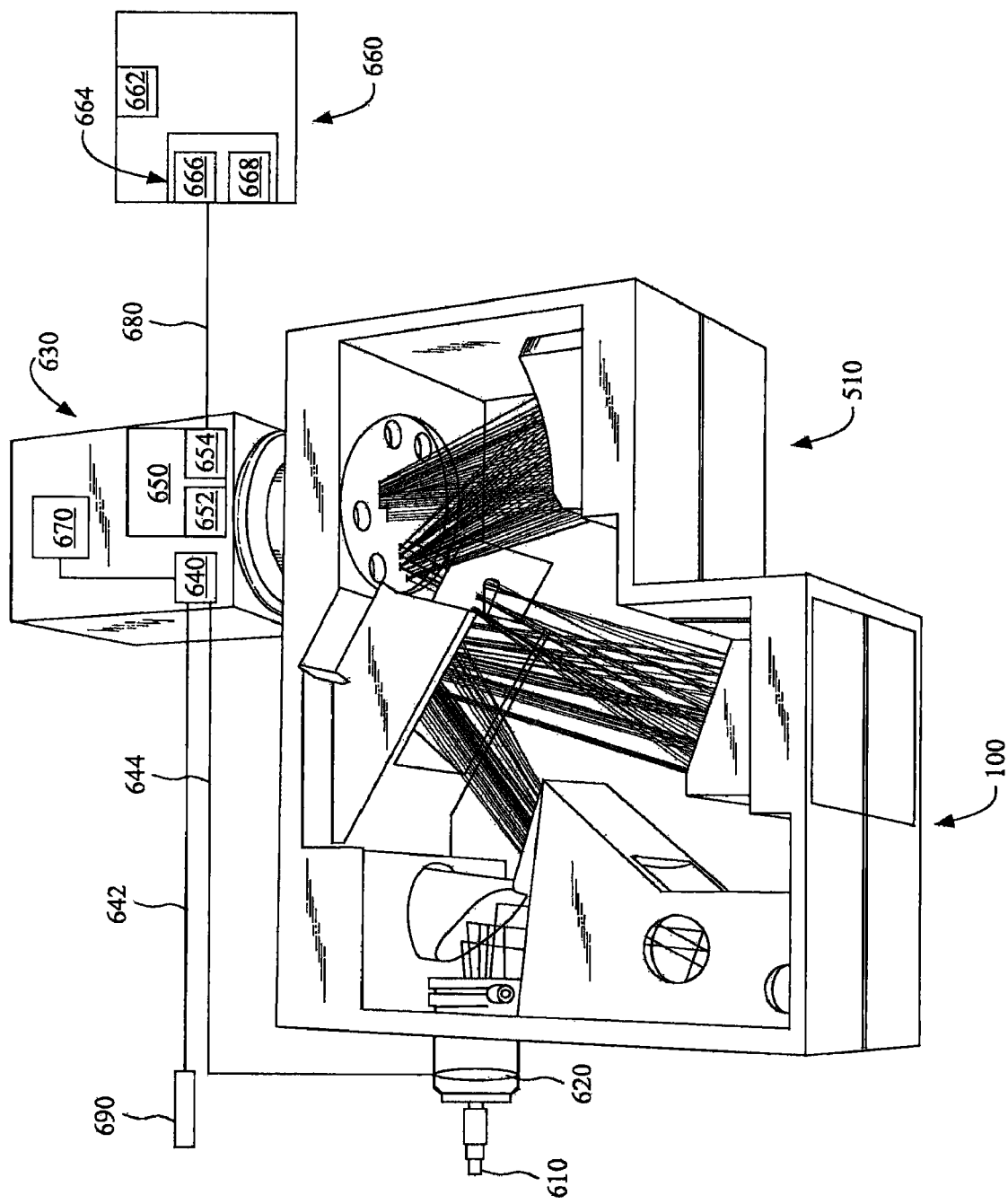

Referring now to FIG. 6B, sensor 630 is a scientific, digital CCD camera used to collect image data of the light from source 200 after it has passed through echelle spectrograph 100. In other embodiments, a complementary metal oxide semiconductor (CMOS) sensor is used to collect the image data. In another embodiment, a hybrid CMOS sensor is used. In still other embodiments the sensor may be an electron multiplying CCD (EMCCD), intensified CCD (ICCD) or any other type of sensor capable of collecting image data from a light source.

In certain embodiments such as laser induced breakdown spectroscopy (LIBS), it is necessary to have a sensor that has high sensitivity and an ability to act as a shutter with a very short exposure time. The short exposure time is commonly referred to as "gate width". An ICCD can provide gate widths down to a few nanoseconds by rapidly changing the voltage on the intensifier's photocathode. Other types of solid state detectors can provide a short gate width by another method called electronic "on-chip" shuttering.

In certain LIBS implementations, sensor 630 is in a non-integrating idle mode between the time lasing device 690 is energized to produce a plasma at source 200 until a few microseconds after the laser pulse. In some embodiments, the first few microseconds after the laser pulse, the plasma emits continuous radiation at all wavelengths. Superimposed on this "continuum" radiation is an emission spectrum created by the atoms and ions within the plasma. Each atomic element within the plasma emits a discrete set of wavelengths that is associated with that element.

Identifying the wavelengths, intensities and peak widths within the emission spectrum can determine the composition, abundances, temperature, pressure and other properties of source 200. In many embodiments, most of the continuum radiation disappears within about 5 microseconds after the laser pulse stops, but the plasma atomic emission continues for another 5 to 20 microseconds. The continuum radiation is very strong but has little useable information and is considered "noise".

After the laser pulse stops, in some embodiments the continuum radiation is reduced to an acceptable level within a few microseconds and then sensor 630 begins integrating, or acquiring an image, for the next 5 to 20 microseconds. An exposure time of 5 to 20 microseconds is extremely short for conventional CCD cameras, which is why LIBS requires either an intensified CCD (ICCD) with a photocathode or a sensor with on-chip shuttering.

In the illustrated embodiment of FIG. 6B, sensor 630 comprises power source 670, processor 640 interconnected with power source 670, memory 650 interconnected with power source 670, lasing device 690 interconnected to processor 640 via communication link 642. The electro-mechanical shutter 620 is interconnected with processor 640 via communication link 644. An electro-mechanical shutter is too slow to provide the short gate width required by applications such as LIBS. However, shutter 620 is useful for preventing light from getting to sensor 630 when dark frame calibrations are performed in any spectroscopy application. An electro-mechanical shutter is also appropriate for any applications that require an exposure time of 3 milliseconds or longer.

In the illustrated embodiment of FIG. 6B, microcode 652 is encoded in memory 650. Processor 640 utilizes microcode 652 to operate sensor 630. Processor 640 forms, and encodes digital image 654 in memory 650.

Processor 640, in combination with memory 650 and microcode 652, comprises, inter alia, a timing controller. In certain embodiments for LIBS applications, the shuttering or "gate width" is provided by either the photocathode in an ICCD camera or by the on-chip shuttering in a non-intensified camera. In certain of these embodiments, processor 640, in combination with microcode 652, functions as, inter alia, a gate width controller.

In the illustrated embodiment of FIG. 6B, processor 640, memory 650, and microcode 652, are shown disposed in sensor 630. In other embodiments, processor 640, memory 650, and microcode 652, are disposed within housing 510. In yet other embodiments, processor 640, memory 650, and microcode 652, are disposed within an assembly which is external to both sensor 630 and echelle spectrograph 100.

Digital image 654 is read out from sensor 630 into external computing device 660. In the illustrated embodiment of FIG. 6B, external computing device 660 comprises processor 662, memory 664, instructions 666 encoded in memory 664, and Applicants' computer program product 668 encoded in memory 664. Digital image 654 is downloaded to computing device using I/O protocol 680 by computer program product 668. Processor 662 utilizes instructions 666 to implement Applicants' method described hereinabove and to link and linearize the various spectral orders to form a continuous wavelength vs. intensity spectral curve from less than 200 nm up to about 1.1 microns for non-intensified silicon based sensors. The wavelength limit is usually defined by the sensitivity of the camera at the longer wavelengths. In some embodiments, sensors such as InGaAs arrays have sensitivity out to beyond 2 microns. An appropriate choice of grating and prism in module 102 could extend the wavelength coverage out to beyond 2 microns. I/O protocol 680 may comprise any sort of input/output protocol, including without limitation a fibre channel loop, USB2, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

As a general matter, computing device 660 comprises, for example and without limitation, a mainframe computer, or a personal computer, or a workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In another embodiment, Applicants' echelle spectrograph 100 can be used simultaneously for LIBS and Raman spectroscopy applications. Raman emissions are typically very weak and their detection requires use of a spectrograph with a very high etendue. The wavelength coverage required for Raman spectrographs is typically a few hundred nanometers on the long wavelength side of the excitation wavelength from the laser source. The laser excitation wavelength can be anywhere in the UV, VIS, or NIR portion of the spectrum. LIBS spectra require a wavelength range from less than 200 nm up to about 1.1 micron. Echelle spectrograph 100 is unique in that it is optically fast enough to detect Raman signals, but has the high resolution and broadband wavelength coverage required for LIBS emission spectra. In this embodiment, elemental information from LIBS can be combined with molecular information from Raman spectroscopy. The combination of LIBS and Raman spectroscopy is far more powerful than either technique by itself. The broadband echelle spectrograph also enables the user to select a Raman excitation source to be located anywhere in the UV/VIS/NIR spectrum. A standard Raman spectrograph will be designed for one wavelength range and lacks the flexibility in choosing a broad range of excitation wavelengths.

Figure 7:
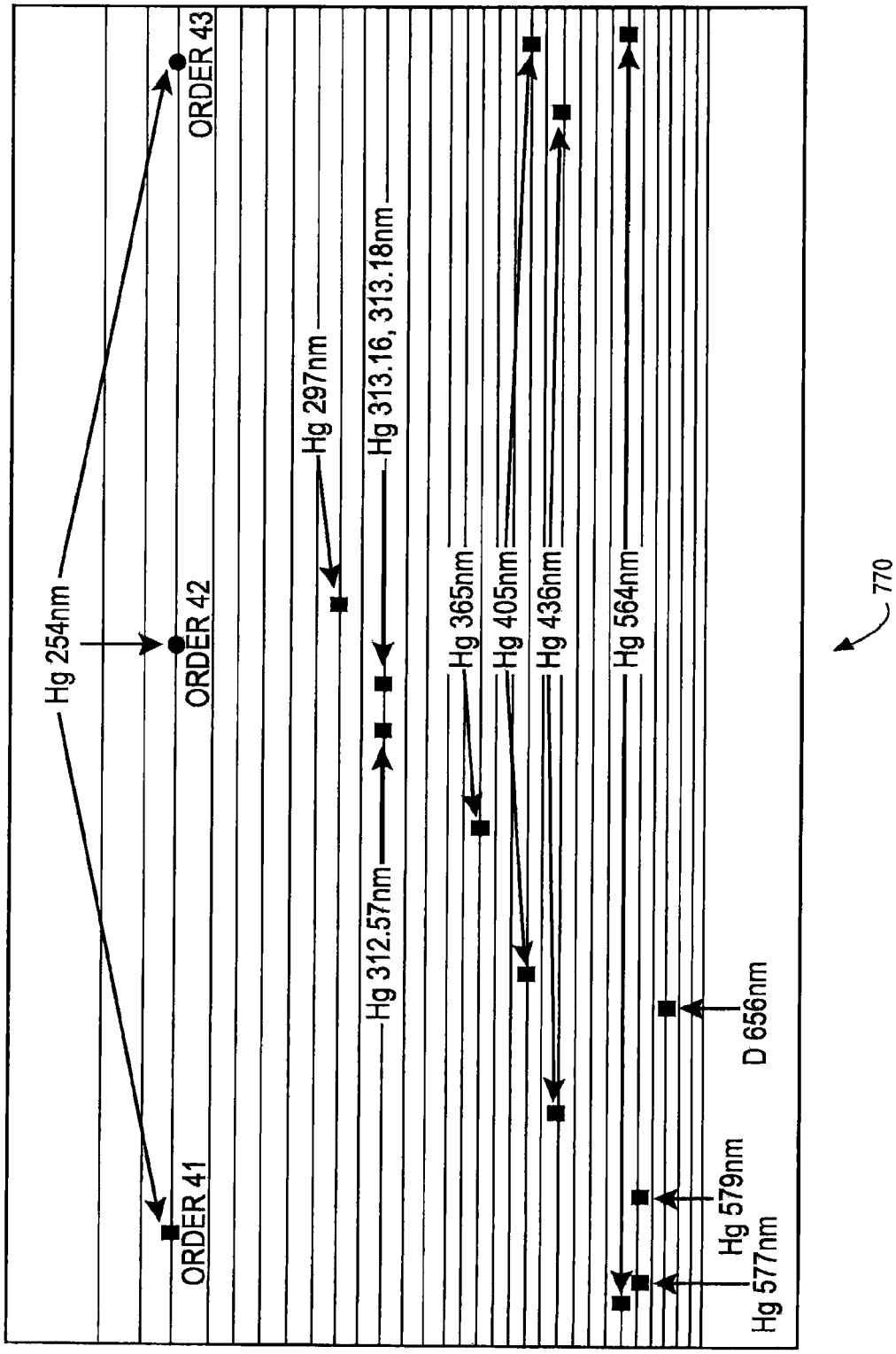
FIG. 7 is an exemplary depiction of an echelle spectrograph image formed at an image plane and acquired with an echelle spectrograph according to the present discussion.

An example of an echelle spectrograph image formed at image plane 190 is shown in FIG. 7 as emission spectrum 700. The emission lines are from a mercury (Hg) and argon (Ar) source 200. A continuum background comprising light from a deuterium/tungsten source 200 has been superimposed on the Hg/Ar spectra to show the location of the spectral orders and Hg emission lines. The ultraviolet orders are towards the top of the image and contain wavelengths up to 400 nm. The visible spectrum is between 400 and 700 nm. The near infrared orders are at the bottom of the image and contain wavelength from 700 nm up to 1.1 microns. Note that the same Hg emission lines can show up in multiple orders. For example, the prominent Hg line at 254 nm appears in spectral orders 41, 42 and 43.

Figure 8:
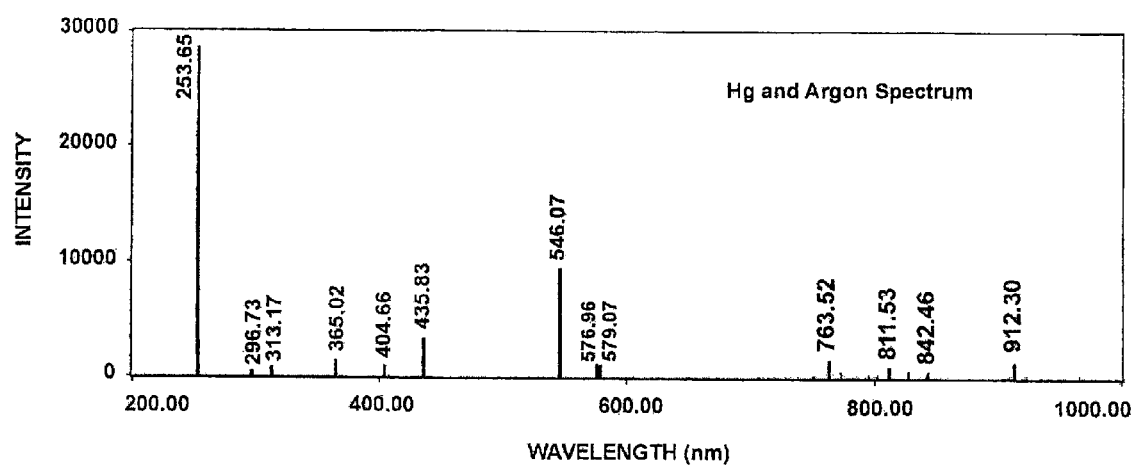
FIG. 8 is an exemplary depiction of a linearized spectral curve for an emission spectrum acquired with an echelle spectrograph according to the present discussion.

Applicant's software eliminates the overlap of wavelength data in the spectral orders and provides a linearized spectral curve of intensity verses wavelength. An example of such a linearized spectral curve for the Hg/Ar emission spectrum acquired with an echelle spectrograph is shown in FIG. 8. This Hg/Ar curve was created with Applicant's spectroscopy software that was designed specifically for use with echelle spectrographs.

In certain embodiments, individual steps described above may be combined, eliminated, or reordered. Instructions 666 are encoded in computer readable medium 664, wherein those instructions are executed by processor 662 to perform one or more of the steps recited. In yet other embodiments, the invention includes instructions residing in any other computer program product, where those instructions are executed by a computer external to, or internal to, a computing system to perform one or more of steps recited. In either case, the instructions may be encoded in computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

Applicant's invention of a TMA is presently implemented in an echelle spectrograph. A person of ordinary skill in the art will understand that this description should not be taken as a limitation and is illustrative only. The applicant's TMA may be implemented in other optical devices, including other spectrographs, without deviating from the scope of the present invention. Additionally, a person of ordinary skill in the art will understand that the Applicant's TMA may comprise a different configuration of mirrors then discussed in terms of the present echelle spectrograph without deviating from the intended scope of the present invention.

In certain embodiments, Applicant's TMA is used in an imaging spectrograph. In still other embodiments, the collimating mirror of such an imaging spectrograph is replaced by a second TMA. In this configuration, the tertiary mirror of the second TMA receives light that passes through the entrance aperture. The light is directed to the secondary mirror and then passes through the intermediate focus and onto the primary mirror. As will be understood by a person of ordinary skill in the art, light leaving the primary mirror is collimated and well corrected over a very large field area.

In certain embodiments, Applicant's invention includes a spectrograph having a second diffraction grating in place of a dispersive prism. As will be understood by a person of ordinary skill in the art, such a configuration can be used to create a large cross dispersion. In yet other embodiments, Applicant's invention includes a spectrograph having two dispersive prisms. As will be understood by a person of ordinary skill in the art, such a configuration also achieves cross dispersion. In still other embodiments, Applicant's invention includes two or more prisms to linearize order separation.

While the preferred embodiments of the present invention have been illustrated in detail, it should be apparent that modifications and adaptations to those embodiments may occur to one skilled in the art without departing from the scope of the present invention.

What is claimed is:

1. A portable hand-held spectrograph, comprising:
a diffraction grating configured to receive light from a radiation source;
a dispersive prism in optical communication with the diffraction grating;
a primary concave mirror configured to reflect light traversing the dispersive prism;
a spheroidal convex secondary mirror configured to receive light reflected by the primary mirror;
a tertiary concave mirror in radiative communication with the secondary mirror, wherein the primary mirror, the secondary mirror, and the tertiary mirror form a three-mirror anastigmat ("TMA") with a common vertex axis; and
an entrance aperture configured to receive light from the radiation source, and a collimating mirror configured to reflect said light in a collimated pattern towards an aperture stop and deliver said light to the diffraction grating, the collimating mirror and the entrance aperture being disposed in an interchangeable module, the entrance aperture being located along a parent optical axis of the collimating mirror,
wherein the diffraction grating is configured for receiving and diffracting light that has passed through the aperture stop into a plurality of beams dispersed by wavelength and directed onto the dispersive prism, and
wherein the portable spectrograph can detect light at wavelengths between 150 nm and 1.1 µm.

2. The portable spectrograph of claim 1, further comprising a flat mirror disposed to a first side of the vertex axis and the flat mirror is for receiving and reflecting a plurality of beams.

3. The portable spectrograph of claim 2, wherein the diffraction grating, the dispersive prism, the aperture stop, and a filter holder are disposed in an interchangeable module.

4. The portable spectrograph of claim 3, further comprising a first baffle formed to define a window, wherein the first baffle is positioned such that radiation reflected from the collimating mirror passes through the window, wherein the first baffle is formed to include a first aperture, wherein the filter holder is positioned within the first aperture.

5. The portable spectrograph of claim 4, further comprising a second baffle formed to include a second aperture, wherein the second baffle is positioned such that the plurality of beams exiting the dispersive prism passes through the second aperture and is directed onto the flat mirror.

6. The portable spectrograph of claim 5, further comprising a third baffle formed to include a third aperture, wherein the third baffle is positioned such that the plurality of beams reflected from the flat mirror passes through the third aperture and are incident upon a portion of the primary mirror, wherein the portion of the primary mirror lies completely on the first side of the vertex axis.

7. The portable spectrograph of claim 6, further comprising a fourth baffle formed to include a fourth aperture, wherein the fourth baffle is positioned such that the plurality of beams reflected from the primary mirror passes through the fourth aperture at an intermediate focus and are directed onto the secondary mirror.

8. The portable spectrograph of claim 7, further comprising a fifth baffle formed to include a fifth aperture, wherein the fifth baffle is positioned such that the plurality of beams reflected from the secondary mirror pass through the fifth aperture and onto a portion of the tertiary mirror, wherein the portion of the tertiary mirror lies completely on a second side of the vertex axis.

9. The portable spectrograph of claim 1, wherein the dispersive prism is disposed between the collimating mirror and the diffraction grating and the dispersive prism is for receiving and directing radiation passed through the aperture stop onto the diffraction grating, wherein the diffraction grating, the dispersive prism, the aperture stop, and a filter holder are disposed in an interchangeable module.

10. The portable spectrograph of claim 2, further comprising:
a fiber optic cable input;
an electro-mechanical shutter; and
a sensor disposed such that the plurality of beams reflected from the tertiary mirror are disposed onto an image plane located within the sensor.

11. A method for laser-induced breakdown spectroscopy (LIBS) using a portable spectrograph comprising:
a collimating mirror configured to collimate light from an object, a diffraction grating adapted to accept the collimated light from the collimating mirror, a dispersive prism optically interconnecting the diffraction grating and a primary mirror, a spheroidal secondary mirror configured to reflect light from the object that has traversed the dispersive prism and to reflect said light towards a tertiary mirror, wherein the primary mirror, the secondary mirror and the tertiary mirror form a three mirror anastigmat ("TMA") having a common vertex axis, wherein the portable spectrograph further comprises a sensor at an image plane of the spectrograph, wherein the portable spectrograph can detect wavelengths between 150 nm and 1.1 μm, the method comprising:

setting the sensor to a first mode, wherein the first mode is a non-integrating idle mode;

energizing a lasing device;

emitting a laser pulse to produce plasma at a radiation source; and setting the sensor to a second mode a few microseconds after the laser pulse is emitted.

12. The method of claim 11, wherein the collimating mirror is disposed in an interchangeable module and the collimating mirror receives and reflects radiation received through an entrance aperture in a collimated pattern towards an aperture stop, wherein the entrance aperture is located along a parent optical axis of the collimating mirror, said method further comprising receiving at said entrance aperture an emission spectrum of radiation formed by atoms and ions disposed within said plasma.

13. The method of claim 12, further comprising acquiring an image using the sensor.

14. The method of claim 13, further comprising:

reading the image from the sensor;

downloading the image to a computing device; and linking and linearizing a plurality of spectral orders to form a spectral curve.

15. A portable spectrograph comprising a processor and a computer-readable medium having computer-readable program code disposed therein to analyze an emission spectrum of a radiation source formed at a location by using laser-induced breakdown spectroscopy (LIBS), said portable spectrograph comprising:

a collimating mirror configured to collimate light from an object, a diffraction grating adapted to accept the collimated light from the collimating mirror, a dispersive prism in optical communication with the diffraction grating, a primary mirror configured to reflect light that has traversed the dispersive prism towards a spheroidal secondary mirror, a tertiary mirror configured to reflect light incident thereupon from the secondary mirror towards a sensor, wherein the primary mirror, the secondary mirror and the tertiary mirror form a three mirror anastigmat ("TMA") having a common vertex axis, wherein the portable spectrograph can detect wavelengths between 150 nm and 1.1 μm, the computer readable program code comprising a series of computer readable program steps to effect:

setting the sensor to a first mode, wherein the first mode is a non-integrating idle mode;

energizing a lasing device to emit a laser-pulse to produce plasma at the location of the radiation source; and setting the sensor to a second mode a few microseconds after the laser pulse is emitted.

16. The portable spectrograph of claim 15, wherein the collimating mirror is disposed in an interchangeable module and the collimating mirror receives and reflects radiation received through an entrance aperture in a collimated pattern towards an aperture stop, wherein the entrance aperture is located along a parent optical axis of the collimating mirror, said computer-readable program code further comprising a series of computer-readable program steps to effect receiving at said entrance aperture an emission spectrum formed by atoms and ions disposed within said plasma.

17. The portable spectrograph of claim 16, said computer readable program code further comprising a series of computer readable program steps to effect acquiring an image using the sensor.

18. The portable spectrograph of claim 17, said computer readable program code further comprising a series of computer readable program steps to effect:

reading the image from the sensor;

downloading the image to a computing device; and linking and linearizing a plurality of spectral orders to form a spectral curve.

* * * * *